(12) United States Patent
Dalby et al.

(10) Patent No.: US 7,580,625 B2
(45) Date of Patent: Aug. 25, 2009

(54) HANDHELD ELECTRONIC DEVICE

(75) Inventors: Anthony Dalby, London (GB); Axel E. Meyer, Helsinki (FI)

(73) Assignee: Nokia Corporation, Espoo (FI)

( * ) Notice: Subject to any disclaimer, the term of this patent is extended or adjusted under 35 U.S.C. 154(b) by 321 days.

(21) Appl. No.: 11/440,701

(22) Filed: May 24, 2006

(65) Prior Publication Data

US 2007/0274700 A1    Nov. 29, 2007

(51) Int. Cl.
  *G03B 15/03*  (2006.01)
  *H05B 31/00*  (2006.01)
  *A61B 1/06*  (2006.01)

(52) U.S. Cl. .................. 396/176; 396/177; 396/178; 362/269; 348/68

(58) Field of Classification Search ................ 396/176, 396/177, 178; 362/269; 348/68
See application file for complete search history.

(56) References Cited

U.S. PATENT DOCUMENTS 5,305,033 A * 4/1994 Takahashi et al. ........... 396/429

2005/0277439 A1   12/2005  Brelo et al.

FOREIGN PATENT DOCUMENTS

| CN | 1272999 | 11/2000 |
|---|---|---|
| WO | WO 2005/083990 | 9/2005 |

* cited by examiner

*Primary Examiner*—Reena Aurora
(74) *Attorney, Agent, or Firm*—Alfred Fressola; Ware, Fressola, Van Der Sluys & Adolphson LLC (57) ABSTRACT

A handheld electronic device 10 comprising first and second parts 11, 12 at least partially retractable with respect to one another along an extension axis 14 of the device to define retracted and extended configurations of the device, the device comprising a camera assembly 13 and a camera illumination assembly 21, the camera illumination assembly being arranged to be between the first and second parts in the extended configuration, the device being arranged such that the camera illumination assembly is substantially housed within the first and/or second parts in the retracted configuration and exposed in the extended configuration.

26 Claims, 8 Drawing Sheets

HANDHELD ELECTRONIC DEVICE

TECHNICAL FIELD

The present invention relates to handheld electronic devices, and in particular to such devices comprising camera and illumination assemblies.

BACKGROUND OF THE INVENTION

It is now common to find digital camera assemblies incorporated into many types of hand-portable electronic devices other than digital cameras. Such hand-portable electronic devices may encompass, for example, user-portable radio telephones (commonly known as mobile or cellular telephones), personal digital assistants (PDAs), portable video gaming devices, portable (e.g. digital) audio/video playback/recording devices or other devices incorporating one or more of the features of the aforementioned. Such hand-portable electronic devices tend to incorporate digital camera assemblies of increasing quality and functionality as various manufacturers compete with each other to provide improved facilities while maintaining portability of the device.

To enable camera assemblies in portable devices to function in a wider range of environments, it is advantageous to incorporate an illumination assembly. Images can then be captured using the camera assembly under lighting conditions that would otherwise be unsuitable or would result in poorer quality images.

Important factors that may need to be taken into account when incorporating an illumination assembly in a handheld electronic device include the following. Firstly, since the illumination assembly would not always be needed, it may be advantageous for it to be hidden when not in use. Secondly, the overall size of the device should not be greatly increased due to the presence of the illumination assembly. Thirdly, the illumination assembly may be a more delicate component, therefore needing additional protection, particularly as the handheld device may be subject to rough handling. Finally, the illumination assembly should be able to illuminate scenes in front of the camera assembly, which may be adapted to rotate or tilt relative to a viewing screen provided on the handheld device.

In particular, when camera assemblies are incorporated into handheld electronic devices, there is now a preference for the camera assembly to be adjustable such that images can be taken of either the user or of a scene in front of the user while the user views the image via a screen on the device. An adjustable camera assembly may typically be provided within a rotatable body part of the hand-portable electronic device. An imaging axis of the camera assembly may thereby be rotated towards or away from the user as desired. It would be advantageous therefore for an illumination assembly to be rotatable with the camera assembly, or to be able to otherwise direct light towards a scene to be imaged by the camera assembly.

It is to be understood that the term "imaging axis" used herein is intended primarily to be defined as being an imaginary axis drawn through an axis of rotational symmetry of a lens within the camera assembly. An imaging axis of a camera assembly will thereby typically be in line with the approximate centre of the field of view of the camera assembly. The imaging axis may alternatively be defined as being an imaginary line drawn from the centre of the imaging window of the camera assembly to the centre of the field of view or scene being imaged by the camera assembly.

One particular type of rotatable camera assembly found in a mobile telephone is described in WO 2005/083990, in which a hand-portable electronic device is disclosed having first and second body parts being rotatable relative to each other by means of a swivel hinge. The second body part comprises a digital camera input device, while the first body part comprises a screen for viewing images captured by the camera. Rotation of the second body part relative to the first body part allows the camera to be oriented in various directions relative to the screen.

OBJECTS OF THE INVENTION

It is an object of the present invention to provide a handheld electronic device comprising a camera assembly with an illumination assembly that is adapted to, when required, direct light towards a scene to be imaged by the camera assembly.

It is a further object of the invention to provide such an illumination assembly for a handheld electronic device that is retractable when not in use.

It is a further object of the invention to provide an illumination assembly for a handheld electronic device that is protected when not in use.

SUMMARY OF THE INVENTION

The invention provides a handheld electronic device comprising first and second parts at least partially retractable with respect to one another along an extension axis of the device to define retracted and extended configurations of the device, the device comprising a camera assembly and a camera illumination assembly, the camera illumination assembly being arranged to be between the first and second parts in the extended configuration, the device being arranged such that the camera illumination assembly is substantially housed within the first and/or second parts in the retracted configuration and exposed in the extended configuration.

The present invention also provides corresponding apparatus. The apparatus may be a module for an electronic device or the device itself. Corresponding means for performing the functions described are also within the present disclosure. One or more aspects, embodiments and/or features of the aspects and/or embodiments in isolation and all various combinations are within the scope of the present disclosure.

BRIEF DESCRIPTION OF THE DRAWINGS

Embodiments of the present invention will now be described by way of example and with reference to the accompanying drawings in which.

DETAILED DESCRIPTION OF THE INVENTION

Figure 1:
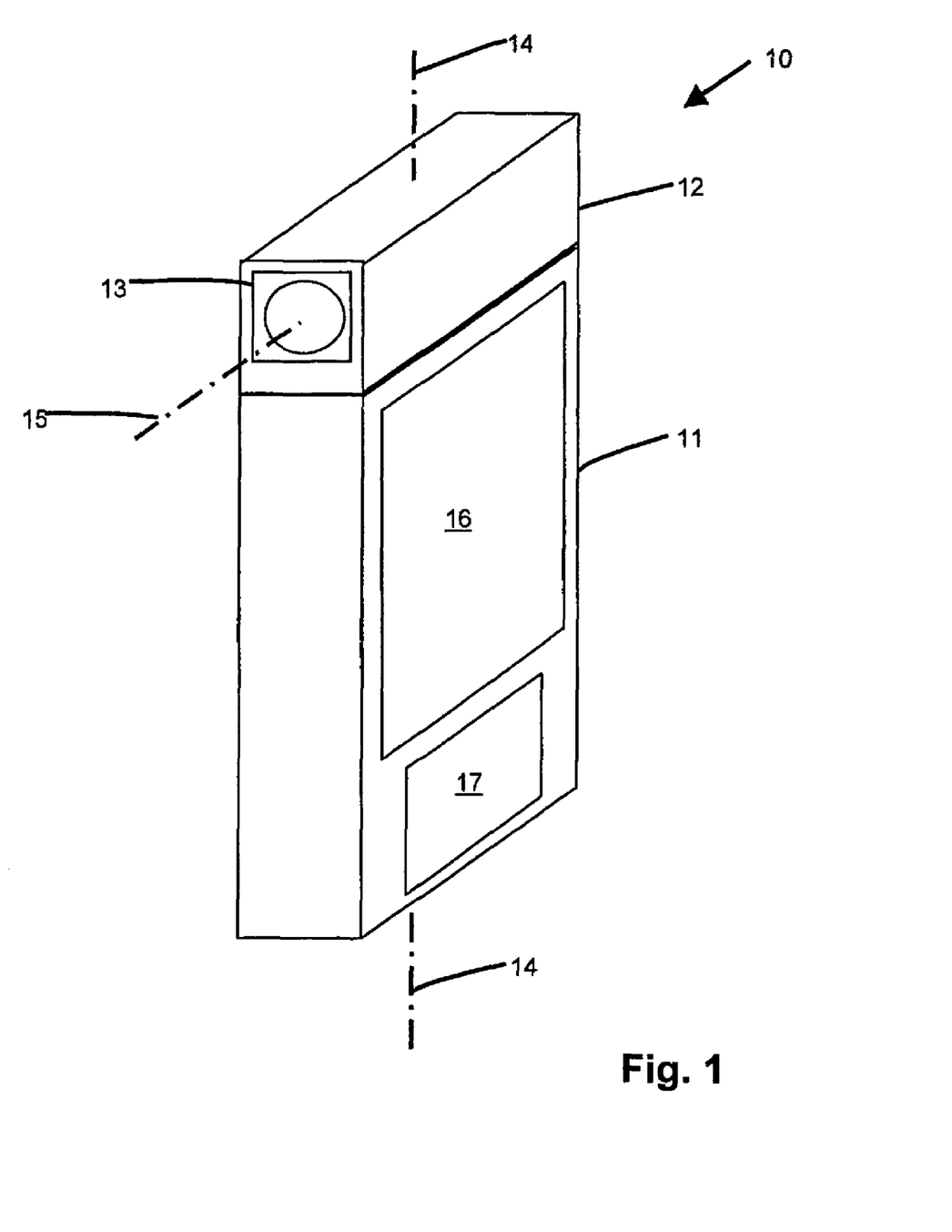
FIG. 1 illustrates an isometric view of a handheld electronic device in a retracted configuration.

Shown in FIG. 1 is an exemplary handheld electronic device according to an embodiment of the invention. The device 10 comprises a first part 11 and a second part 12. The first part 11 may comprise features such as a viewing screen 16 and a touch sensitive user input area 17, which may comprise a number of keys for controlling the operation of the device 10. Further user input areas may also be provided on the first and/or second parts 11, 12 for controlling various aspects of the device 10. The viewing screen 16 may also be a touch sensitive viewing screen sensitive to user input. The second part 12 comprises a camera assembly 13 having an imaging axis 15 along which the camera assembly is adapted to capture images. An extension axis 14 is defined along the device 10, the relevance of which is described below in relation to the various operations of the device 10.

Figure 2:
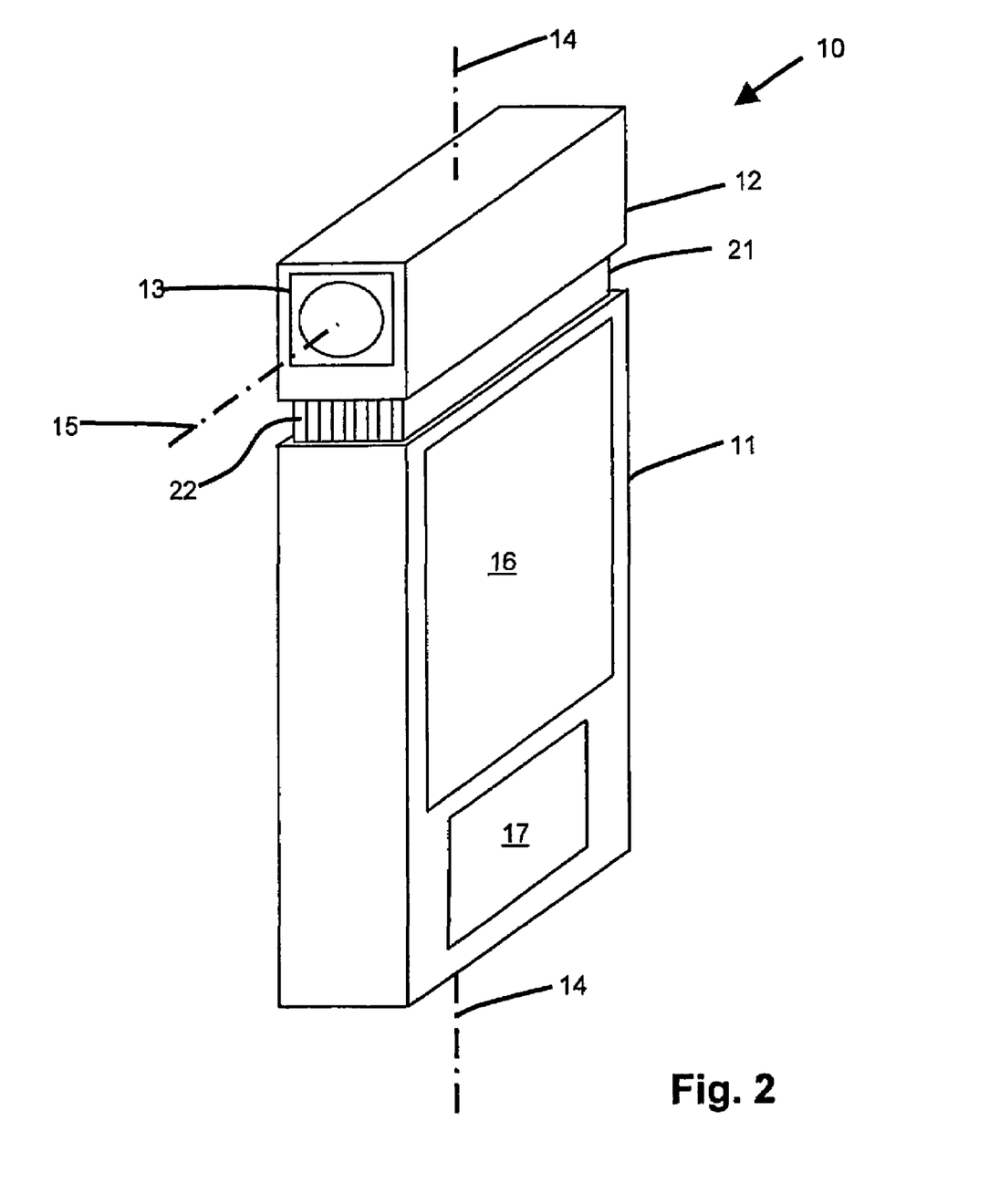
FIG. 2 illustrates an isometric view of the handheld electronic device of FIG. 1 in an extended configuration.

Shown in FIG. 2 is the device 10 of FIG. 1 in an extended configuration. In this extended configuration the second part 12 is extended along the extension axis 14 relative to the first part 11. Transforming the device 10 from the retracted configuration of FIG. 1 to the extended configuration of FIG. 2 exposes a camera illumination assembly 21, the camera illumination assembly 21 being arranged to be between the first and second parts 11, 12 in this extended configuration.

The camera illumination assembly 21 may be retractable into either the first 11 or second part 12. Alternatively, the camera illumination assembly 21 may be partially retractable into both parts 11, 12.

In the extended configuration shown in FIG. 2, the camera assembly may be operable by a user to capture an image of a scene in line with the imaging axis 15 of the camera assembly 13. Typically, the image to be captured is viewed on a screen 16 provided on the second part, although a viewfinder (not shown) may also or alternatively be provided in the second part 12.

The illumination assembly 21 of the device 10 of FIG. 2 may further be provided with a camera illumination window 22, through which light from the illumination assembly 21 can pass for illuminating a scene in line with the imaging axis 15. In the embodiment shown in FIG. 2, the other faces of the illumination assembly 21 do not allow light to pass through them.

In the configuration shown in FIG. 2, the imaging axis 15 is oriented parallel to the plane of the screen 16, and would thereby be configured to capture an image of a scene to the side of a user viewing the screen 16. In order to capture an image of a scene in front of the user or to capture an image of the user, the second part 12 comprising the camera assembly 13 may be rotatable with respect to the first part 11 about the extension axis 14.

Figure 3:
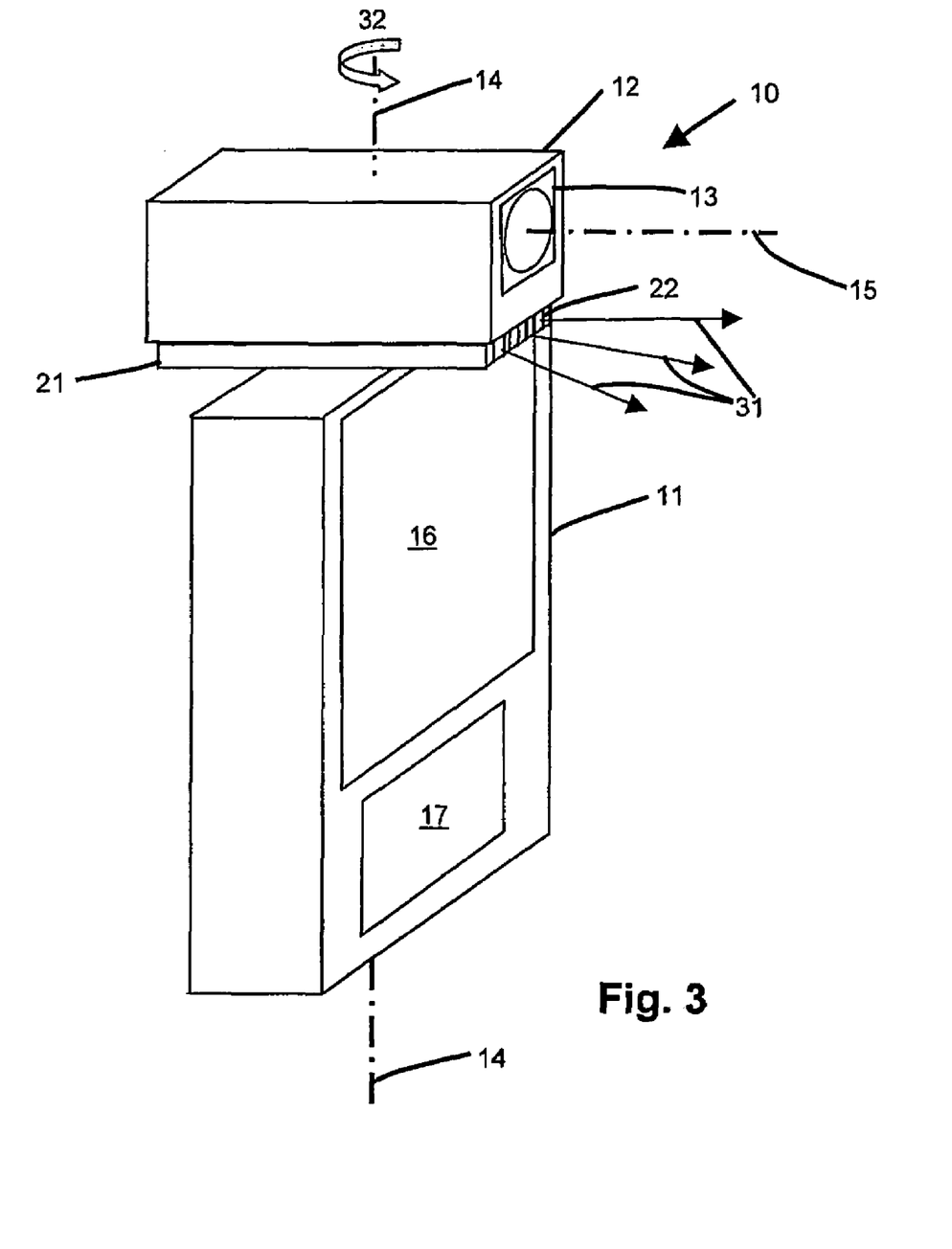
FIG. 3 illustrates an isometric view of a handheld electronic device in an extended and rotated configuration.

Shown in FIG. 3 is an embodiment of the handheld electronic device 10 of the invention in which the second part 12 is rotatable and is shown rotated approximately 90 degrees about the extension axis 14 with respect to the first part 11. In this configuration, the imaging axis 15 of the camera assembly 13 is aligned so as to allow the camera assembly 13 to capture an image of a user viewing the screen 16. The second part 12 may further be rotatable to capture an image in front of the user by rotating the second part 12 from the configuration shown in FIG. 2 90 degrees in the opposite direction to that indicated by arrow 32.

In the exemplary embodiment of FIG. 3, the camera illumination assembly 21 is adapted to rotate with the second part 12 about the extension axis in the direction 32 when the device 10 is in the extended configuration. The illumination window 22 is thereby oriented to pass light 31 in the general direction of the imaging axis 15 in whatever rotational orientation the second part 12 is in.

Figure 4:
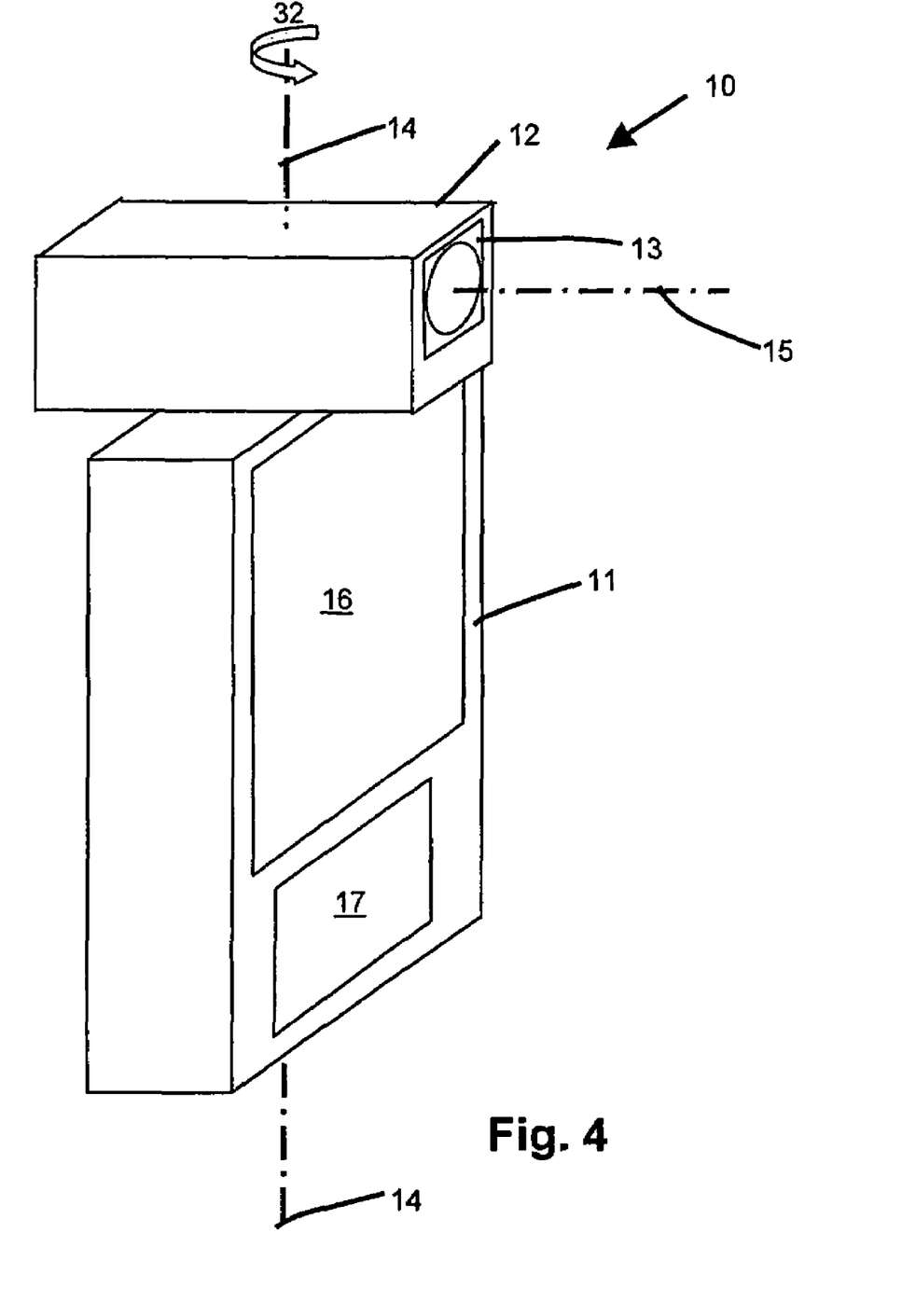
FIG. 4 illustrates an isometric view of a handheld electronic device in a retracted and rotated configuration.

An alternative exemplary configuration of the handheld electronic device 10 of the invention is shown in FIG. 4. In this configuration, the second part 12 is shown rotated in the direction 32 relative to the first part 11, but without the camera illumination assembly (21, FIG. 3) being extended. Such a configuration represents a situation where the illumination assembly 21 is not required for capturing an image using the camera assembly 13. The illumination assembly may remain housed in either the first part 11 or the second part 12. The illumination assembly 21 may be extendable from the first or second parts 11, 12 to obtain the extended and rotated configuration of FIG. 3. The configurations of FIGS. 3 and 4 may thereby be interchangeable through retraction and extension of the illumination assembly from the second part.

Figure 5:
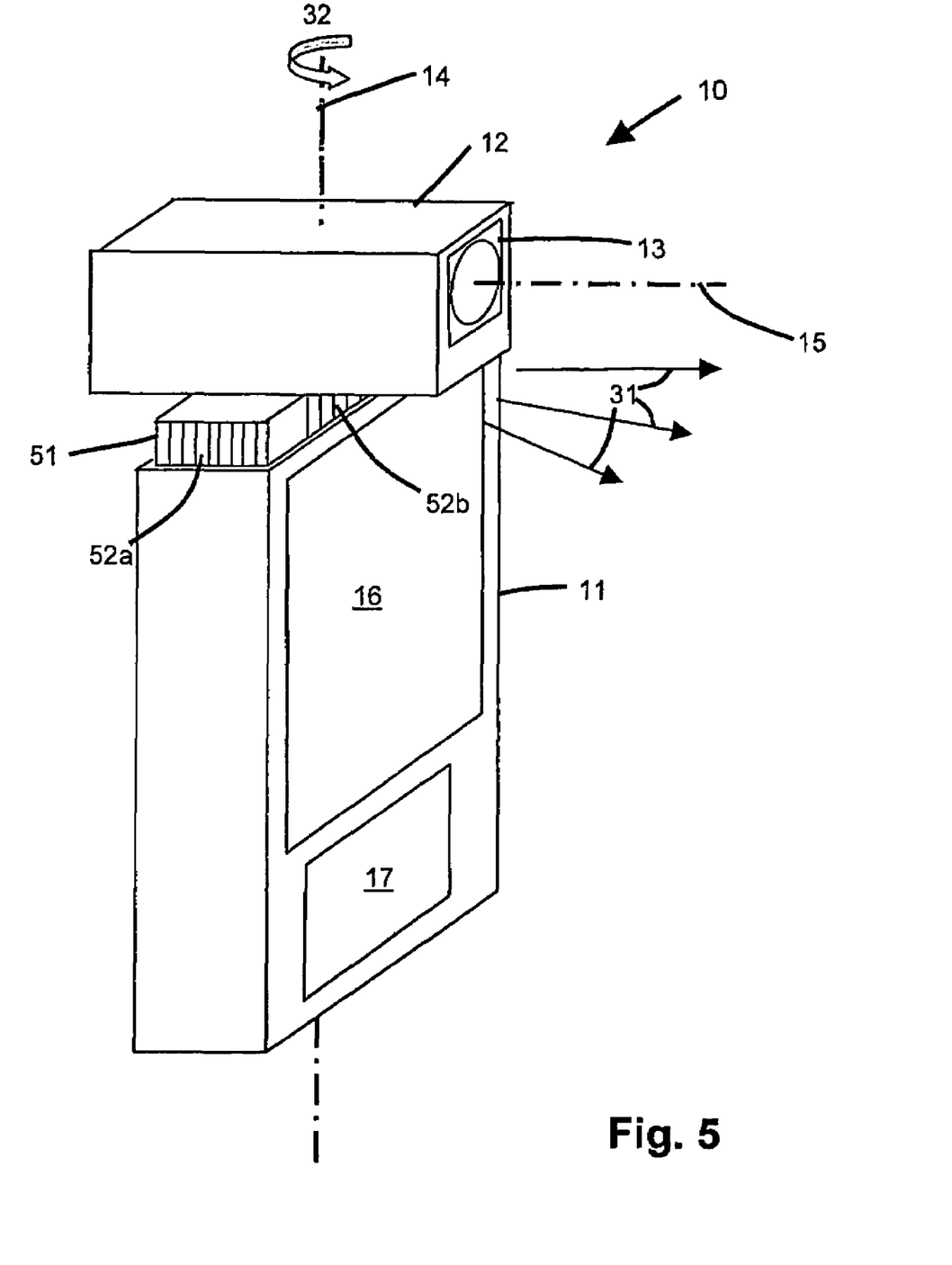
FIG. 5 illustrates an isometric view of a handheld electronic device in an extended and rotated configuration.

Another exemplary embodiment of the handheld electronic device 10 of the invention is shown in FIG. 5. In this embodiment, the camera illumination assembly 51 is extracted from the first part 11 and does not rotate relative to the first part 11. Instead, a plurality of illumination windows 52a, 52b are provided on exposed faces of the illumination assembly in the extended configuration. The illumination assembly 51 comprises an arrangement, described in more detail below in relation to FIGS. 8a and 8b, to direct light 31 through one of the plurality of illumination windows 52a, 52b, the particular illumination window selected depending on the particular orientation of the second part 12.

Figure 6:
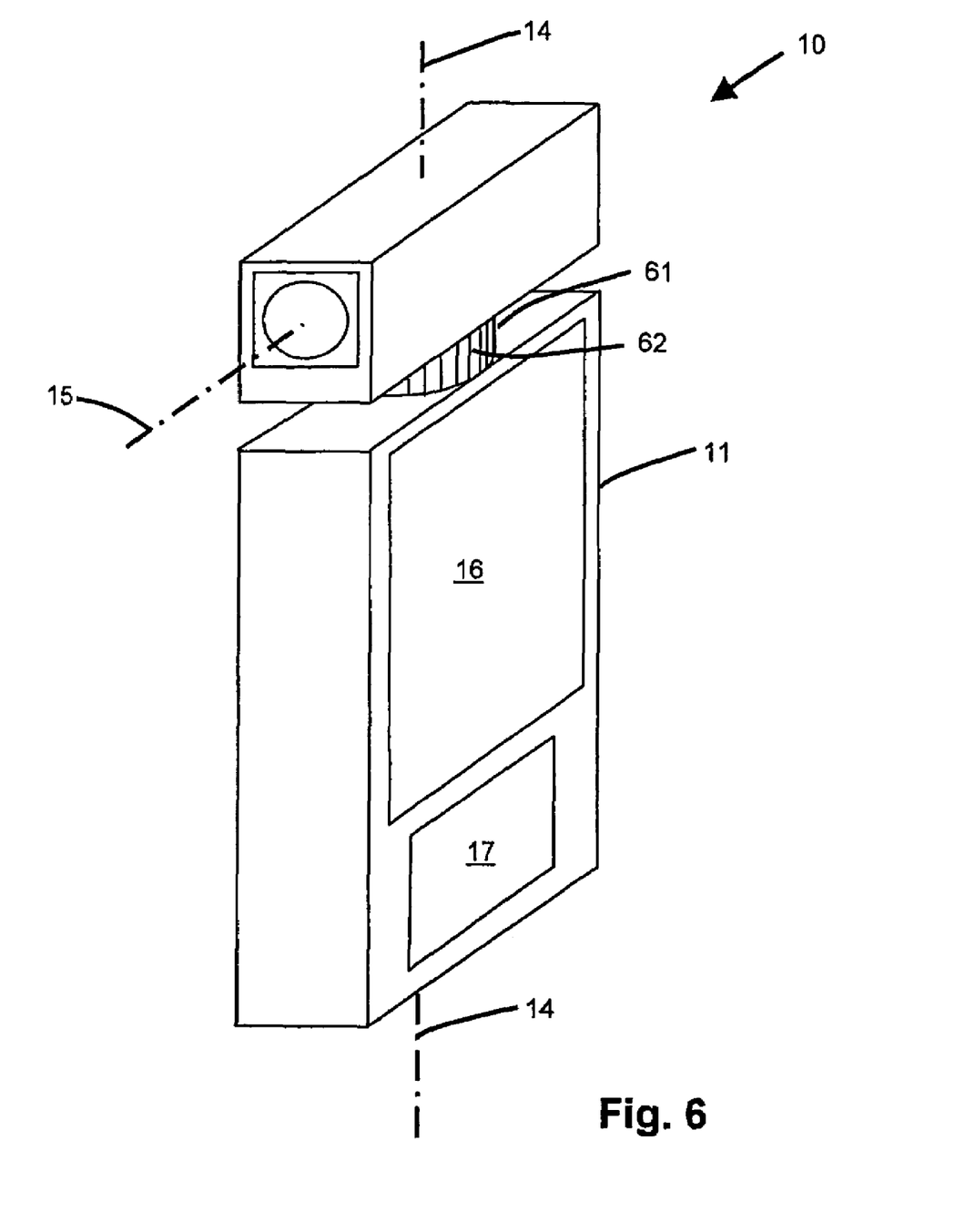
FIG. 6 illustrates an isometric view of a handheld electronic device in an extended configuration.

A further alternative exemplary embodiment of the handheld electronic device 10 of the invention is shown in FIG. 6. In this embodiment, the illumination assembly 61 has a substantially circular cross-sectional shape in a plane orthogonal to the extension axis 14. The illumination assembly 61 may be provided with one or more windows 62 for light to pass through in the direction of the imaging axis 15 of the camera assembly 13. The window or windows 62 may comprise a single circular-shaped window or a plurality of windows arranged around the exposed faces of the illumination assembly 61. A shield or reflector to direct light from a light emitting element within the illumination assembly 61 may be provided either internal or external to the illumination assembly 61. The arrangement and various possible embodiments in relation to the shield are described in further detail below in relation to FIGS. 7a and 7b.

Figure 7A:
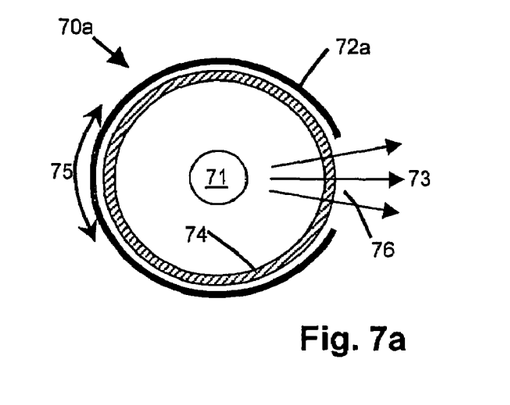
FIGS. 7a and 7b illustrate plan cross-sectional views of embodiments of an illumination assembly.

An exemplary embodiment of an illumination assembly 70a is shown in cross-sectional plan view in FIG. 7a. The illumination assembly 70a comprises a light emitting element 71 within a circular illumination window 74. A shield 72a is provided external to the circular window 74, the shield 72a comprising an opening 76 through which light 73 from the light emitting element 71 may pass. The shield 72 is located concentrically in relation to the illumination window 74, and is adapted to rotate in the directions indicated by arrow 75, so as to direct light 73 in the general direction of the camera assembly axis (15, FIG. 6). The shield 72 may be adapted to be user rotatable about the extension axis 14 of the device 10 (FIG. 6).

Figure 7B:
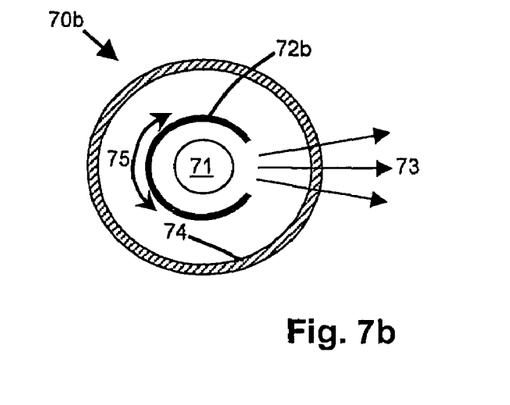

Another arrangement for an illumination assembly 70b is shown in FIG. 7b, in which a shield 72b is arranged to be internal to the illumination window 74. The shield 72b otherwise operates similarly to that in FIG. 7a, in being adapted to be user rotatable with the second part 12 about the extension axis 14 of the device 10 (FIG. 6).

Figure 8A:
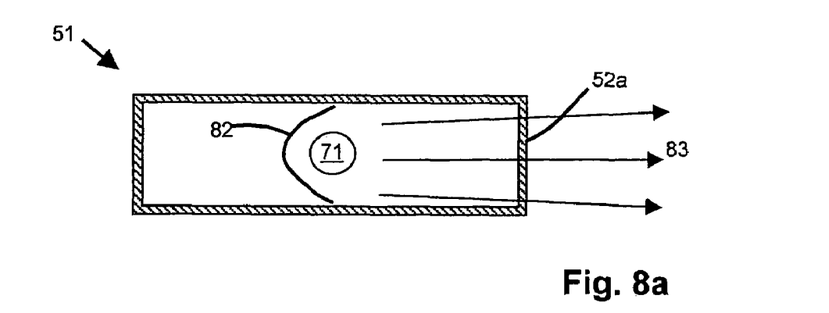
FIGS. 8a and 8b illustrate plan cross-sectional views of alternative embodiments of an illumination assembly.
Figure 8B:
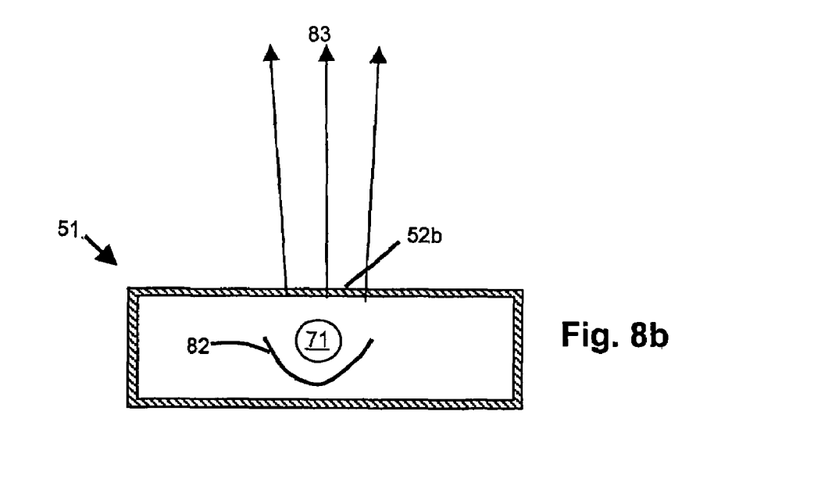

An exemplary schematic embodiment of an illumination assembly 51 suitable for the handheld electronic device 10 of FIG. 5 is shown in FIG. 8a. In the illumination assembly 51 is a shield 82 to direct light 83 from a light emitting element 71 through an illumination window 52a. The shield 82, and optionally the light emitting element 71, may be rotatable about the extension axis 14 of the device 10. A rotated configuration is shown in FIG. 8b, where the shield is rotated 90 degrees from the position shown in FIG. 8a, thus directing light through an illumination window 52b provided in another face of the illumination assembly 51.

To further concentrate the light 73, 83 emitted from the illumination assembly 51, 70a, 70b, the shield 72b, 82 may comprise a reflector. The reflector may be a parabolic reflector 82, i.e. adapted to reflect light emitted from a focal point of the reflector 82 substantially in a single direction. The light emitting element 71 may thereby advantageously be positioned at or around the focal point of the parabolic reflector 82.

The light emitting element 71 may be adapted to emit light in substantially all directions orthogonal to the extension axis 14, i.e. in all radial directions as shown in FIGS. 7a-8b. Alternatively, the light emitting element 71 may be adapted to emit light in a selected range of directions, for example by having a suitable internal reflector or lens arrangement so as to direct light substantially within a predetermined arc. If the latter, a separate shield 82 may be unnecessary, and rotation of the light emitting element itself with the second part 12 about the extension axis 14 may achieve the aim of directing light through a selected window 52a, 52b or through the window 74 in a user-selectable direction.

It is to be understood that the light emitting element 71 may emit light over a selected range of frequencies that may include visible light. Alternatively or additionally the light emitting element 71 may emit light outside the normally visible region, such as in the infrared or ultraviolet regions. If the light emitting element emits light in the infrared region, the camera assembly may be adapted to capture infrared images in very low ambient light conditions or even total darkness without causing visible light to be emitted.

As described above in relation to FIGS. 7a to 8b, the shield 72a, 72b, 82 may be arranged to rotate with the second part 12 about the extension axis 14 of the device 10 with respect to the first part 11 when the device 10 is in the extended and/or retracted configurations. Alternatively, the shield 82 may rotate together with both the illumination assembly 21 (FIG. 3) and the second part 12. For example, the arrangement shown in FIG. 8a may be suitable for the rotatable illumination assembly 21 of FIG. 3, comprising a single illumination window 22 that rotates with the second part 12.

Figure 9A:
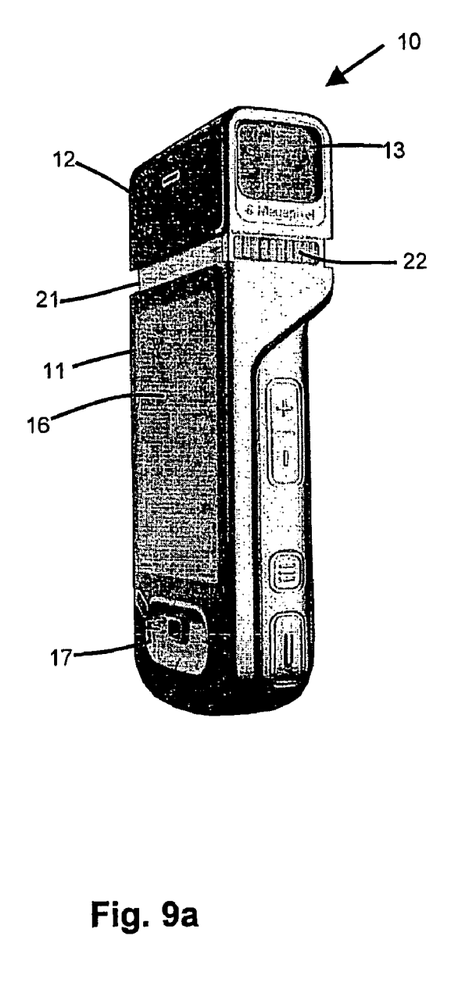
FIGS. 9a and 9b illustrate perspective views of extended and retracted configurations of an exemplary handheld electronic device.
Figure 9B:
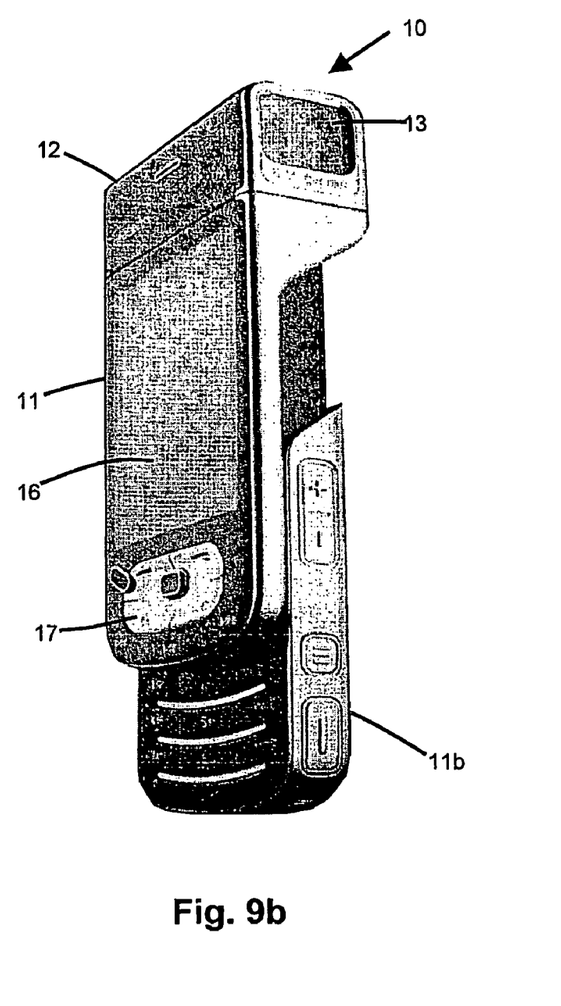

Shown in FIGS. 9a and 9b is an exemplary embodiment of a handheld electronic device 10 according to the invention. FIG. 9a shows the device 10 in an extended configuration, with an illumination assembly 21 having an illumination window 22 exposed and arranged between the first and second parts 11, 12. FIG. 9b shows the same device 10 in a retracted configuration, with the illumination assembly retracted and thereby protected within the device housing. FIG. 9b also shows a further slidable part 11b, which does not cause to extension/retraction of the illumination assembly 21.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

While there have been shown and described and pointed out fundamental novel features of the invention as applied to preferred embodiments thereof, it will be understood that various omissions and substitutions and changes in the form and details of the devices and methods described may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto. Furthermore, in the claims means-plus-function clauses are intended to cover the structures described herein as performing the recited function and not only structural equivalents, but also equivalent structures. Thus although a nail and a screw may not be structural equivalents in that a nail employs a cylindrical surface to secure wooden parts together, whereas a screw employs a helical surface, in the environment of fastening wooden parts, a nail and a screw may be equivalent structures.

What is claimed is:

1. An apparatus comprising first and second parts at least partially retractable with respect to one another along an extension axis of the apparatus to define retracted and extended configurations of the apparatus, a camera assembly, and a camera illumination assembly, wherein the camera illumination assembly is configured to be between the first and second parts in the extended configuration, and wherein the apparatus is configured such that the camera illumination assembly is substantially housed within the first and/or second parts in the retracted configuration and exposed in the extended configuration.

2. The apparatus of claim 1 wherein the apparatus is configured to protect a camera illumination window when the apparatus is in the retracted configuration.

3. The apparatus of claim 1 wherein the apparatus is configured to protect the camera illumination assembly when the apparatus is in the retraced configuration.

4. The apparatus of claim 1 wherein the apparatus is configured such that the first and second parts are rotatable with respect to one another about the extension axis.

5. The apparatus of claim 4 wherein the apparatus is configured such that the camera illumination assembly is independently rotatable with respect to the first and second parts about the extension axis.

6. The apparatus of claim 4 wherein the apparatus is configured such that the camera illumination assembly rotates together with the first or second part about the extension axis of the apparatus.

7. The apparatus of claim 4, wherein one or more of the first and second parts comprises the camera assembly and wherein the apparatus is configured such that the camera illumination assembly rotates together with the part comprising the camera assembly about the extension axis of the apparatus.

8. The apparatus of claim 4, wherein one or more of the first and second parts comprises the camera assembly and wherein the apparatus is configured such that the camera illumination assembly rotates together with the part comprising the camera assembly about the extension axis of the apparatus in the extended configuration.

9. The apparatus of claim 1 further comprising a shield to inhibit light from a light emitting element comprised within the camera illumination assembly in directions away from an imaging axis of the camera assembly.

10. The apparatus of claim 9 wherein the shield is configured to be user rotatable about the extension axis of the apparatus.

11. The apparatus of claim 9 wherein the shield is external to a camera illumination assembly window.

12. The apparatus of claim 9 wherein the shield is internal to the illumination assembly.

13. The apparatus of claim 9 wherein the shield is arranged to reflect light from the light emitting element to direct light in the direction of the imaging axis.

14. The apparatus of claim 9 wherein the shield is a parabolic reflector having a focal point coincident with the light emitting element.

15. The apparatus of claim 9 wherein the light emitting element is configured to emit light in substantially all directions orthogonal to the extension axis of the apparatus and the shield is arranged to inhibit light in directions away from the direction of the imaging axis.

16. The apparatus of claim 9 wherein the first or second part comprises the camera assembly and the shield is arranged to rotate together with camera assembly.

17. The apparatus of claim 16 wherein a cross-sectional shape of a camera illumination window in a plane orthogonal to the extension axis is substantially circular, the shield being configured to be substantially concentric with the camera illumination window.

18. The apparatus of claim 1 wherein one or more of the first and second parts comprises the camera assembly, and the first/second parts are configured to be rotatable between a plurality of rotated positions, one or more of a plurality of camera illumination windows being configured to allow illumination of a scene within a field of view of the camera assembly in each rotated position, and wherein the apparatus is configured such that rotating the parts with respect to one another selectively directs light through one of the plurality of camera illumination windows.

19. The apparatus of claim 18 wherein the shield is configured to selectively direct light through one of a plurality of windows in each of the plurality of rotated positions.

20. The apparatus of claim 1 wherein the camera illumination assembly is substantially enclosed within the first part in the retracted configuration.

21. The apparatus of claim 1 wherein the illumination assembly is substantially enclosed within the second part in the retracted configuration.

22. The apparatus of claim 1 wherein the second part is rotatable about the extension axis of the apparatus with respect to the first part when the apparatus is in the extended configuration.

23. The apparatus of claim 22 wherein the second part is not rotatable about the extension axis of the apparatus with respect to the first part when the apparatus is in the retracted configuration.

24. An apparatus comprising first and second parts at least partially retractable with respect to one another along an extension axis of the apparatus to define retracted and extended configurations of the apparatus, means for capturing an image of a scene and means for illuminating a scene, wherein the means for illuminating are configured to be between the first and second parts in the extended configuration, and wherein the apparatus is configured such that the means for illuminating is substantially housed within the first and/or second parts in the retracted configuration and exposed in the extended configuration.

25. The apparatus of claim 24, wherein the apparatus is configured to protect a camera illumination window when the apparatus is in the retracted configuration.

26. A method comprising extending a handheld electronic apparatus into an extended configuration from a retracted configuration, wherein the handheld electronic apparatus comprises first and second parts at least partially retractable with respect to one another along an extension axis of the apparatus to define retracted and extended configurations of the apparatus, a camera assembly and a camera illumination assembly, wherein the camera illumination assembly is configured to be between the first and second parts in the extended configuration, the apparatus being configured such that the camera illumination assembly is substantially housed within the first and/or second parts in the retracted configuration and exposed in the extended configuration.

\* \* \* \* \*